(12) United States Patent
Koga

(10) Patent No.: US 7,562,381 B2
(45) Date of Patent: Jul. 14, 2009

(54) CAMERA UNIT AND CAMERA UNIT CONTROL METHOD CAPABLE OF AVOIDING CONFUSION WHEN OPERATED BY A PLURALITY OF USERS

(75) Inventor: Hisashi Koga, Fukuoka (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 10/566,185

(22) PCT Filed: Jul. 29, 2004

(86) PCT No.: PCT/JP2004/011208

§ 371 (c)(1),
(2), (4) Date: Jan. 27, 2006

(87) PCT Pub. No.: WO2005/013607

PCT Pub. Date: Feb. 10, 2005

(65) Prior Publication Data

US 2006/0203097 A1    Sep. 14, 2006

(30) Foreign Application Priority Data

Jul. 30, 2003    (JP)    ............................ 2003-282631

(51) Int. Cl.
*H04N 7/173*    (2006.01)
*H04N 5/225*    (2006.01)
*H04N 5/232*    (2006.01)

(52) U.S. Cl. ............... 725/105; 348/207.11; 348/211.3; 348/211.8

(58) Field of Classification Search ............... 348/207.1, 348/207.11, 211.3, 211.4, 211.5, 211.7, 211.8, 348/211.11; 725/105
See application file for complete search history.

(56) References Cited

U.S. PATENT DOCUMENTS 6,067,624 A    5/2000    Kuno (Continued)

FOREIGN PATENT DOCUMENTS

EP    0821522    1/1998

(Continued)

OTHER PUBLICATIONS

PCT International Search Report dated Oct. 1, 2004.

*Primary Examiner*—John M Villecco
(74) *Attorney, Agent, or Firm*—Dickinson Wright, PLLC

(57) ABSTRACT

The invention, receiving a camera operation screen request from a client terminal, determines a code to be transmitted to the client terminal and transmits the code to the client terminal together with camera operation screen information, registers to a memory a code attached to a drive request signal transmitted from the client terminal, and, receiving a drive request signal from a client terminal, controls the camera in accordance with the signal in case a code matching a registered code is included, and rejects the drive request in case a code matching the registered code is not included. With this configuration, when a plurality of users operate a common camera unit via a network, a code determined by the camera unit is returned from a client terminal and the client terminal is identified based on whether the code is matching. This eliminates the needs for issuing a special id for identifying a client terminal and allows easy operation anywhere from the network by using a general-purpose browser.

25 Claims, 7 Drawing Sheets

U.S. PATENT DOCUMENTS

| | | | |
|---|---|---|---|
| 6,133,941 A * | 10/2000 | Ono | 348/14.05 |
| 6,239,836 B1 * | 5/2001 | Suzuki et al. | 348/211.3 |
| 6,414,716 B1 | 7/2002 | Kawai | |
| 6,438,587 B2 * | 8/2002 | Kitamura | 709/217 |
| 6,473,796 B2 * | 10/2002 | Tanaka | 709/224 |
| 6,836,287 B1 * | 12/2004 | Nakahara | 348/211.12 |
| 6,856,346 B1 * | 2/2005 | Kobayashi et al. | 348/211.99 |
| 6,903,765 B1 * | 6/2005 | Takagi et al. | 348/211.4 |
| 6,965,399 B1 * | 11/2005 | Oka et al. | 348/211.99 |
| 7,071,972 B2 * | 7/2006 | Koyama | 348/211.3 |
| 7,113,971 B1 * | 9/2006 | Ohi et al. | 709/203 |
| 7,161,623 B2 * | 1/2007 | Kuno | 348/211.3 |
| 7,256,821 B2 * | 8/2007 | Hata | 348/211.3 |
| 7,296,287 B2 * | 11/2007 | Watanabe et al. | 725/113 |
| 7,340,766 B2 * | 3/2008 | Nagao et al. | 725/105 |
| 7,369,160 B2 * | 5/2008 | Fujino et al. | 348/211.3 |
| 7,373,395 B2 * | 5/2008 | Brailean et al. | 725/105 |
| 7,382,397 B2 * | 6/2008 | Mottur | 348/142 |
| 7,423,670 B2 * | 9/2008 | Kawai et al. | 348/211.99 |
| 2003/0184651 A1 * | 10/2003 | Ohsawa et al. | 348/207.1 |
| 2004/0090508 A1 * | 5/2004 | Chowdry et al. | 347/103 |

FOREIGN PATENT DOCUMENTS

| | | |
|---|---|---|
| JP | 10042278 | 2/1998 |
| JP | 2001186395 | 7/2001 |
| JP | 2003299073 | 10/2003 |

\* cited by examiner

US 7,562,381 B2

CAMERA UNIT AND CAMERA UNIT CONTROL METHOD CAPABLE OF AVOIDING CONFUSION WHEN OPERATED BY A PLURALITY OF USERS

FIELD OF THE INVENTION

The present invention relates a camera unit capable of avoiding confusion of operation in the presence of racing of operation requests when each of a plurality of users has a right to operate a common camera unit over a network.

BACKGROUND INFORMATION

Recently, a plurality of users remotely control a single camera unit over a network and receive shot images via the network, thanks to widespread use of the Internet. A problem involved is that the plurality of users are dispersed and each of them operates the common camera unit without knowing the circumstances of the other users; simultaneous attempts to use the same camera unit have naturally resulted in conflicting requests for the use of the camera unit.

Japanese Patent Laid-Open No. 042278/1998 proposes an imaging unit which controls the period for control right in response to a plurality of control requests based on the occurrence of control requests. The imaging unit registers a plurality of clients which issue control right requests in a camera control queue, a type of buffer for registering information on control instruction in chronological order. Detecting that a control request has been issued from one of the plurality of clients registered in the queue, the imaging unit determines whether to switch the control right based on the period for control right assigned to another client in case the source client has no longer its control right. Determining that the control right is to take pace, the imaging unit updates the contents of the camera control queue in order to switch the control rights between clients. In this way, when a single imaging unit is controlled by a plurality of users, a control request from a client is discarded while another client is controlling the imaging unit, based on identification of each client.

The related art technology requests each client to own a client ID; this approach is not suited for a system where a general-purpose browser controls an imaging unit. An alternative approach of using an IP address for identification is not effective either, because an IP address is converted in case data is transmitted across a plurality of networks.

An object of the invention is to avoid confusion of operation despite racing of operation requests when a plurality of users attempt to operate a common camera unit via a network. Another object of the invention is to allow a user to operate the camera unit by using a general-purpose browser from anywhere in a network without experiencing confusion or using a special ID for identifying client terminals.

SUMMARY OF THE INVENTION

A camera unit according to the invention is designed to, when receiving a first signal from a client terminal, transmit to the client terminal identification information to identify the client terminal. When a second signal is received from the client terminal, the camera unit operates on a priority basis in accordance with the second signal including the identification signal for a predetermined period after receipt of the second signal, without working in accordance with a second signal from another client terminal. With this configuration, when the users of a plurality of client terminals attempt to operate a common camera unit via a network, each client terminal is readily capable of operating the camera unit by using a general-purpose browser from anywhere in the network.

In an exclusive operation state where the camera unit according to the invention operates on a priority basis in accordance with a camera operation signal from a client terminal, the camera unit does not accept another camera operation request from another client terminal, which assures that the two camera operation requests do not conflict with each other. The user can perform camera operation up to the end without being interrupted.

When a predetermined period is exceeded, the exclusive operation state is canceled. This allows control by another client terminal and assures a comfortable operating environment for the user.

Identification of a client terminal is determined based on identification information determined in response to an access from the client terminal. It is thus unnecessary to issue a special ID to identify a client terminal. This simplifies the structure of the camera unit and relieves the user at a client terminal of complicated operation.

The predetermined period is one during which it is determined that a camera operation signal including the same identification information is not received. As a result, when a camera operation signal from a client terminal is no longer received, the exclusive operation state is canceled, which speeds up the subsequent processing.

A predetermined period may be determined based on a combination with a period in which camera operation is complete. Thus, the exclusive operation state is typically canceled when camera operation is complete. In case a longer operation time than expected has elapsed, the exclusive operation state is automatically canceled.

BEST MODE FOR CARRYING OUT THE INVENTION

Embodiment 1

Figure 1:
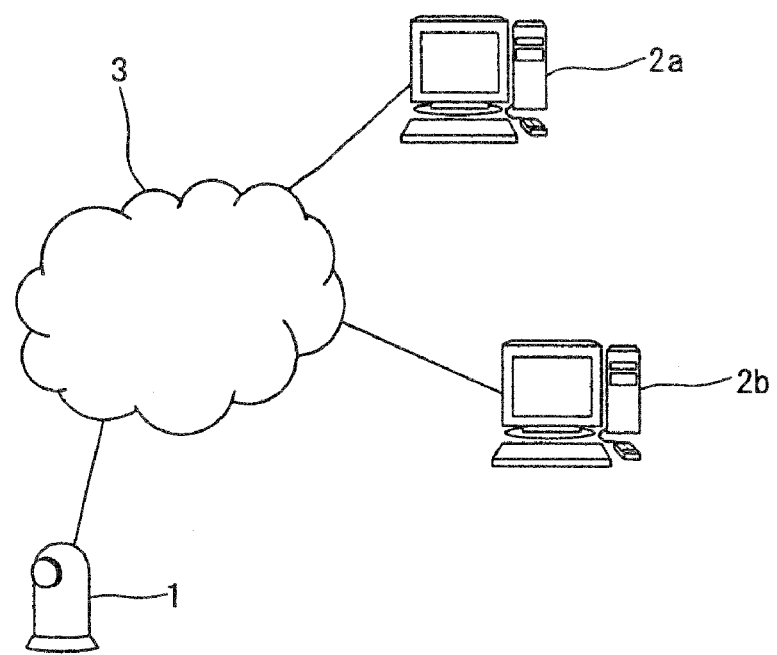
FIG. 1 shows a configuration of a camera system comprising a camera unit and a client terminal according to Embodiment 1 of the invention.
Figure 2:
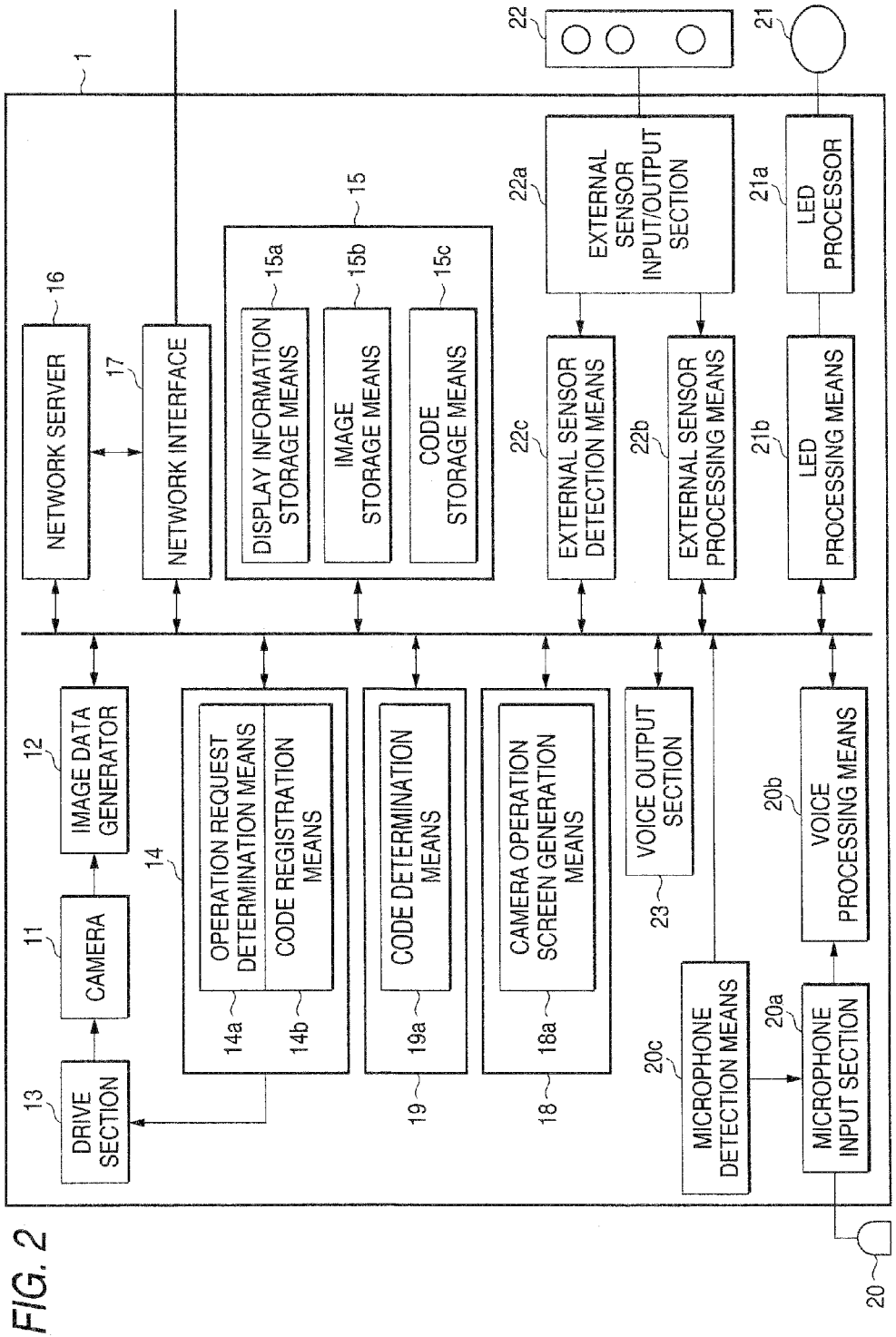
FIG. 2 shows a configuration of the camera unit according to Embodiment 1 of the invention.

A camera unit according to Embodiment 1 is described below referring to drawings. The camera unit according to Embodiment 1 generates a unique code in response to a request for camera operation screen issued from a client terminal and transmits camera operation screen including this code to the client terminal, which operates the camera unit by using the camera operation screen. When another client terminal has requested operation by way of another code during operation of the camera unit, the camera unit rejects an imaging section drive request transmitted later. FIG. 1 shows a configuration of a camera system comprising a camera unit and a client terminal according to Embodiment 1 of the invention. FIG. 2 shows a configuration of the camera unit according to Embodiment 1 of the invention.

In FIG. 1, a numeral 1 represents a camera unit which shoots a subject and transfers image data obtained. Numerals 2a and 2b represent client terminals such as PCs. From a client terminal, the user transmits a camera operation screen request to the camera unit 1 and displays a camera operation screen based on the received camera operation screen information (described in HTML and so on). When a user at a client terminal transmits an imaging section drive request to the camera unit 1 by using the camera operation screen, the client terminal receives an image transmitted from the camera unit 1 and displays the image. These client terminals 2a, 2b are general terms for two terminals as an example among multiple client terminals and are called the client terminal 2 for simplicity.

A numeral 3 is a network such as the Internet. The network 3 transmits the camera operation screen request mentioned above and camera operation screen information, an imaging section drive request such as a rotation start request and a rotation stop request transmitted from a client terminal, as well as an image.

A camera system according to Embodiment 1 comprises the camera unit 1, the client terminal 2 and the network 3.

A numeral 11 represents a camera provided on the camera unit 1 which shoots a subject by using a photoelectric conversion unit by way of operation from the client terminal 2. A numeral 12 represents an image data generator which converts the format of a picture signal output from the camera unit 1 to produce a brightness (Y) signal and a color difference signal (Cr) as image data and compresses the image data obtained by using a predetermined format such as JPEG and TIF formats in order to provide a data amount suited for a communications rate on a network.

A numeral 13 represents a driver for operating the camera 11 in a shooting direction (panning or tilting) as well as start and stop of shooting. A numeral 14 represents camera control means for controlling the driver 13. A numeral 14a represents operation request determination means for determining whether the received code in a coded imaging section drive request transmitted from the client terminal 2 by using a camera operation screen is a registered one, and what the requested operation is. A numeral 14b represents code registration means for transmitting to the client terminal 1 the code determined on the camera unit 1 together with camera operation screen information, as mentioned later, and registering a code in the format of a transmitted imaging section drive request transmitted accordingly to code storage means 15c (mentioned later).

A numeral 15 represents storage means for storing various information, 15a display information storage means for storing screen display information described in a markup language such as HTML, 15b image storage means for storing image data generated by the image data generator 12, and 15c code storage means for storing the determined code.

The screen display information is format information described in HTML, etc. which lays out on the screen the information linked with a URL on a network. A browser on the client terminal 2, receiving the screen display information, presents the information as a display screen on a display section (not shown). Such a display screen is so-called a web page in the context of communications with a network such as the Internet by way of HTTP.

A numeral 16 represents a network server for receiving a request notice describing camera operations such as a camera operation screen request and a rotation start request. The network server 16 transmits to the client terminal 2 the image display information generated by the image data generator 12 such as image data and camera operation screen information. A numeral 17 represents a network interface for performing communications control.

The network server 16, transmitting/receiving a packet by using the HTTP protocol as used on the Internet, transmits screen display information such as camera operation screen information to the network. Receiving a camera operation screen request or a rotation start request, the network server 16 transmits the information to the operation request determination means 14a. The operation request determination means 14a extracts a code from the format of the coded rotation start request in order to perform determination. In case the camera unit 1 is not operating, the code registration means 14b registers the code to the code storage means 15c.

A numeral 18 represents a display information generator for generating screen display information described in HTML, etc., 18a camera operation screen generation means for determining a code by way of code determination means 19a mentioned later and generating camera operation screen information including this code for operation on the client terminal 2. The camera operation screen generation means 18a, in the first place, provides a link to the URL of an image in order to display the camera image in the screen format. The camera operation screen generation means 18a, in the second place, generates camera screen display information which displays a camera operation button in the format to describe that a coded rotation start request will be transmitted to the camera unit 1 and which transmits the request to the client terminal 2 with operation of the camera operation button in order to activate the operation request determination means 14a. Here, the camera operation screen information includes an image and a camera operation button. When the user clicks on a camera display button, a rotation start request is transmitted to the camera unit 1. This causes an image and a camera operation button to be displayed on the client terminal 2. When the user clicks on the camera display button, a rotation start request is transmitted to the operation request determination means 14a of the camera unit 1.

For example, a link concerning Pan Left operation is specified by HYPERLINK "http://(host name of the camera or" http://(host name of the camera or IP address)/(camera operation file)?(camera operation identifier)=(camera operation name) &(start/stop identifier)=(Start or stop)&(KeyCode identifier) =(KeyCode). In this example, "direction", a camera operation name such as "Pan Left" is transmitted for the camera operation identifier, "Start" is transmitted for the start/stop identifier "Action", and the code "2003062512001000" is transmitted for the code identifier "KeyCode". cgi is activated by using "HYPERLINK http://(host name of the camera or IP address) or "http://(host name of the camera or IP address)/(camera operation file)?Direction=PanLeft&Action=Start&KeyCode=200306251 2001000 in order to start camera operation. Camera operation names include "Pan Right", "Tilt down", "Tilt up", "Zoom Tele", "ZoomWide", "Focus Near" and "Focus Far" as well as "Pan Left".

A numeral 19 represents control means for performing system control of the camera unit 1 which comprises a CPU and which loads a program from the storage means 15 in order to server as feature implementation means. A numeral 19a represents code determination means for determining a code serving as information for identification. The code determination means 19a assigns a unique code to each camera operation screen information item to be transmitted so that an operation request issued from each camera operation screen information item will be unique. In Embodiment 1, a system clock obtained by counting the clock signals of the camera unit 1 is used. When a unique code assigned to the camera operation screen information is determined, a value of the system clock then obtained is employed as a unique code. Any unique code including the information of a hardware clock in the unit as similar time information or a process ID of the processing on the CPU may be used also.

The camera control means 14, the operation request determination means 14a, the code registration means 14b, the control means 19, the code determination means 19a, the display information generator 18, and the camera operation screen generation means 18a described above are all means as feature implementation means, so that they can be configures as a controller which implements all features.

A numeral 20 represents a microphone for picking up an external sound, 20a a microphone input section as an interface for the microphone 20, 20b voice processing means for performing voice signal processing on an A/D-converted signal, and 20c microphone detection means for detecting connection of the microphone 20 and incorporates the microphone 20 into a system including the camera unit 1. A numeral 21 represents an LED provided on the camera unit 1, 21a an LED processor for turning on the LED, 21b LED processing means serving as a driver for the LED processing means 21b. A numeral 22 represents an external sensor for detecting the external state, 22a a an external sensor input/output section as an interface for the external sensor 22, 22b external sensor processing means for processing an A/D-converted signal detected, and 22c external sensor detection means for detecting connection of the external sensor 22 and incorporates the external sensor 22 into a system including the camera unit 1. A numeral 23 represents voice output means for outputting a voice signal as a voice from a loudspeaker, etc.

Figure 3:
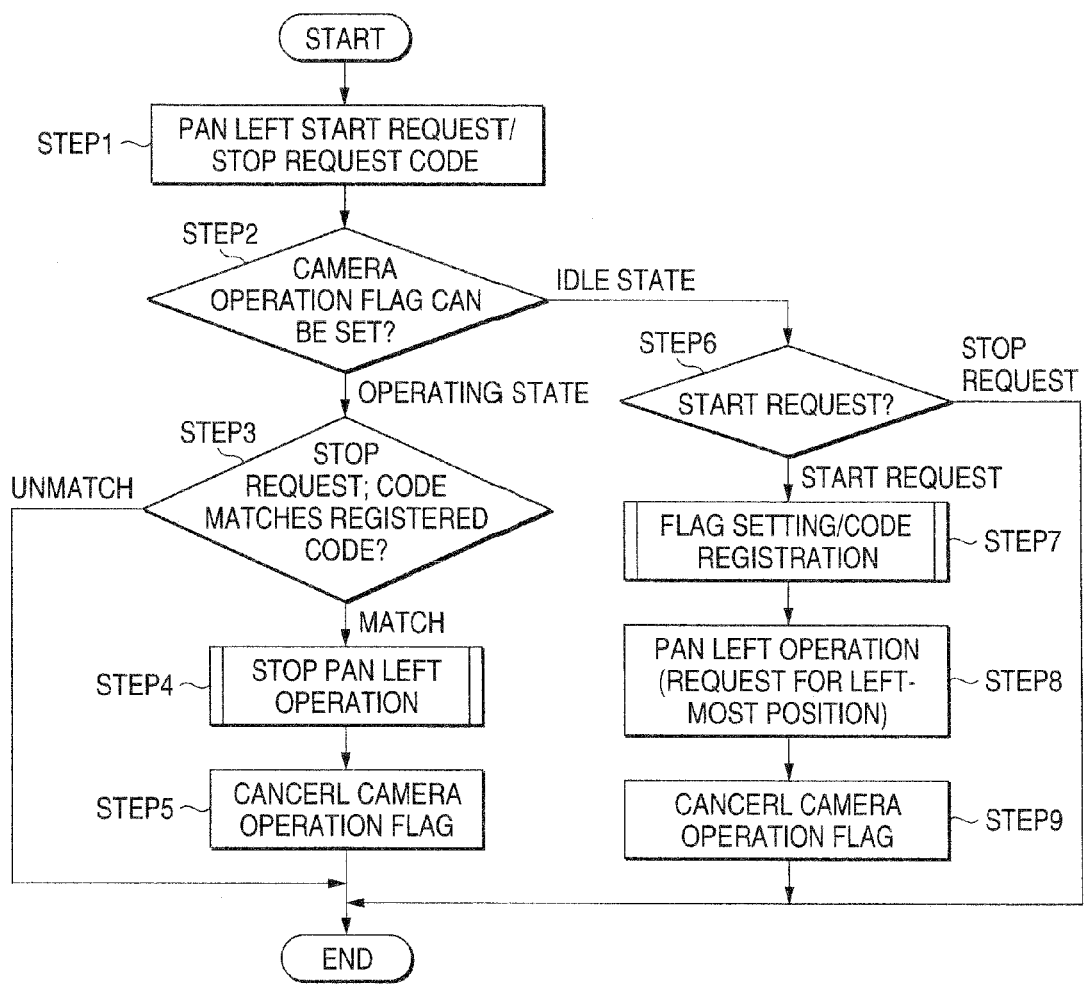
FIG. 3 is a flowchart of the processing in response to a rotation start request and a stop request of a camera unit according to Embodiment 1 of the invention.

A processing flow used when a "Pan Left" request and a stop request are made with codes included by the client terminal 2 to the camera unit 1 according to Embodiment 1. FIG. 3 is a flowchart of the processing in response to a rotation start request and a stop request of a camera unit according to Embodiment 1 of the invention. FIGS. 1 and 2 are also referenced.

FIG. 3 is described below. When the client terminal 2 makes a camera operation screen request, the code determination means 19a generates a unique code in response the request, and transmits camera operation screen information including the code to the client terminal 2. On the client terminal, the camera operation screen is displayed on the display section (not shown) by way of display control means such as a browser. In this state, the user at the client terminal 2 clicks on an icon on the operation screen displayed using the camera operation screen information to transmit a camera operation start request or stop request to the camera unit 1. These camera operation requests include a transmitted code as well as the camera operation screen information.

The camera unit 1, receiving camera operation information such as a "Pan Left" operation start request or stop request including the code, (step 1), checks whether a camera operation flag can be set (step 2). In case the system is idle and the camera operation flag can be set anew, execution proceeds to step 6 (mentioned later).

When the camera unit 1 is already in the operating state (camera flag is set) and the camera unit 1 is in the exclusive operation state, the camera unit 1 checks whether the received request is a stop request and whether the code attached to the received requests matches a registered code (step 3). In case they are not matched in step 3, the processing on the camera unit 1 neglects the request and enters the standby state. A request is not accepted in case a code match is not obtained.

In case the received request is a stop request and a match has occurred between the code attached to the received request and a registered code, the "Pan Left" operation is stopped (step 4) and the camera operation flag for camera operation is cleared (step 5) and the camera unit 1 returns to the idle state.

In case the camera unit 1 is in the idle state and not in the exclusive operation state so that the camera operation flag can be set, it is checked whether the received request is a rotation start request or a rotation stop request (step 6). In case the received request is a rotation start request, the camera operation flag is set and the code registration means 14b registers the code to the code storage means 15c (step 7) and executes the "Pan Left" operation to the leftmost position (step 8). When this operation is over, the camera unit 1 clears the camera operation flag (step 6) and returns to the idle state. In case the received request is a rotation stop request in step 2, the camera unit 1 returns to the idle state.

For the camera unit 1 according to Embodiment 1, a coded rotation start request is transmitted to the camera unit 1 by way of operation on the camera operation screen. When a rotation start request is received by the camera unit 1, a camera operation flag is set in case the camera unit 1 is idle. The camera operation flag is reset except for the operation on the camera operation screen on the client terminal 2a, which provides the request exclusion state. A code is extracted from the coded rotation start request and is stored into the code storage means 15c for camera operation.

For example, even in the presence of a camera operation screen request by another client terminal 2 before occurrence of the request exclusion state, when the camera operation flag is set to the client terminal 2a, any other subsequent coded rotation start request is received from the client terminal 2b is checked against codes registered to the code storage means 15 by the operation request determination means 14a and it is determined that the client terminal 2b does not have a control right and the request is rejected.

For the processing sequences by the camera unit 1 and the client terminal 2a according to Embodiment 1, four cases will be specifically described: (1) processing sequence in which a code is attached to the camera operation screen information and each request; (2) sequence in which a stop request is used to stop the camera rotation without conflicting with another client terminal; (3) sequence in which camera rotation is stopped without a stop request or a conflict with another client terminal; (4) sequence in which the camera is operated from the client terminal 2a and a conflict has occurred with another client terminal 2b.

Figure 4:
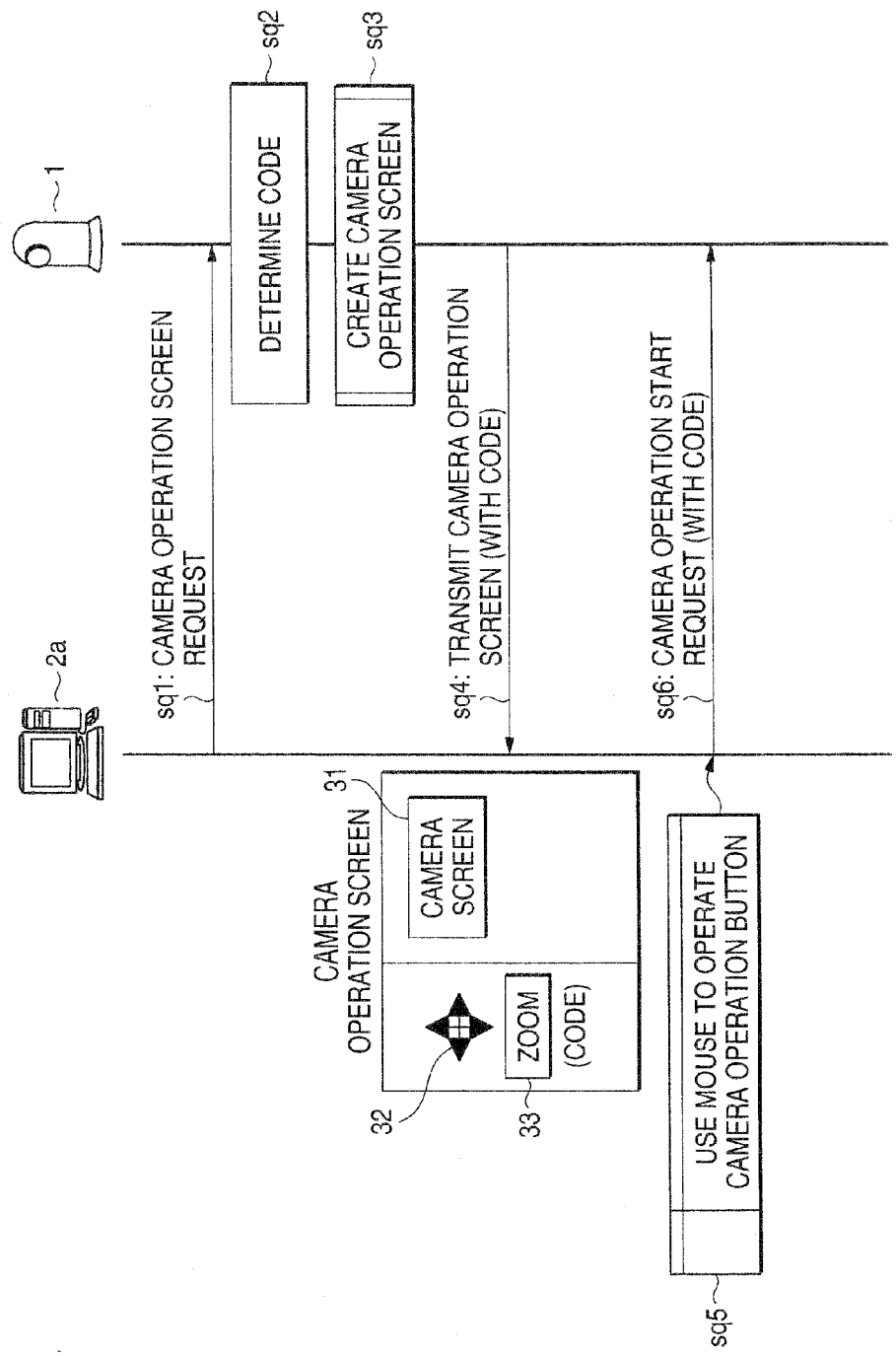
FIG. 4 is a sequence chart of a procedure for attaching a code to camera operation screen information followed by a camera unit and a client terminal according to Embodiment 1 of the invention.

The sequence (1) in which a code is attached to the camera operation screen information will be described. FIG. 4 is a sequence chart of a procedure for attaching a code to camera operation screen information followed by a camera unit and a client terminal according to Embodiment 1 of the invention.

As shown in FIG. 4, when a camera operation screen request is made by a client terminal 2b (sq 1), the code determination means 19a of the camera unit 1 determines a code by way of a system clock (sq 2) and the camera operation screen generation means 18*a* creates camera operation screen information (sq 3) and transmits a coded camera operation screen (sq 4).

The camera operation screen then displayed on the client terminal 2 is as shown in FIG. 4. A camera image 31 is displayed, and a camera operation button 32 for operating Pan/Tilt and a zoom button 33 for performing zoom operation are displayed. Taking the "Pan Left" operation as an example, the camera operation screen information describes, in HTML, <AHREF="http://192.168.0.253/CameraControl?Direction=PanLeft&Action=Start&KeyCode=2003062512001000>. In this case, as mentioned above, "192.168.0.253/" is the IP address of the network server 16 and "CameraControl" is the file name on the camera operation screen. "Action" indicates start or end of operation of the imaging section. When a mouse button is clicked in the area left to the camera operation button 32 on the camera operation screen, "Start" is input, which activates cgi and starts the "Pan Left" operation. This operation is stopped when the mouse button is released. "KeyCode" is used to embed a unique code determined using a system clock into the camera operation screen information.

In order to display the image 31, the camera operation screen information further describes, following the aforementioned description, <input TYPE SRC=" HYPERLINK "http://192.168.0.253/MotionJpeg¥">. Description <input TYPE SRC=" HYPERLINK "http://192.168.0.253/MotionJpeg"> is to specify potion picture display using "MotionJPeg" to the network server of the camera unit 1 in order to arrange an image in position on the camera operation screen.

In case the camera operation button 32 is also used as a start/stop button, description should use Java®Script™capable of dynamically changing the "Name/Value" parameter of cgi. The camera operation screen information describes a requested format to activate the operation request determination means 14*a* of the camera unit 1. A start/stop button may be separately arranged from the camera operation button 32.

When the camera operation button 32 is operated using a mouse on the camera operation screen displayed using the camera operation screen information (sq 5), a coded rotation start request is transmitted to the camera unit 1 (sq 6). The operation request determination means 14*a*, receiving the request, extracts a camera operation name and a code and stores the extracted code into the code storage means 15*c* as well as starts operation corresponding to the extracted operation name.

For example, in case <AHREF="http://192.168.0.253/CameraControl?Direction=PanLeft&Action=Start&KeyCode=2003062512001000>, when "Pan Left" is operated by the user with a mouse, the information "http://192.168.0.253/CameraControl?Direction=PanLeft&Action=Start&KeyCode=2003062512001000 is extracted by the client terminal 2*a* and transmitted to the camera unit 1. The camera unit 1 extracts start of "Pan Left" and the key code "003062512001000" from the transmitted information and starts corresponding operation.

Figure 5:
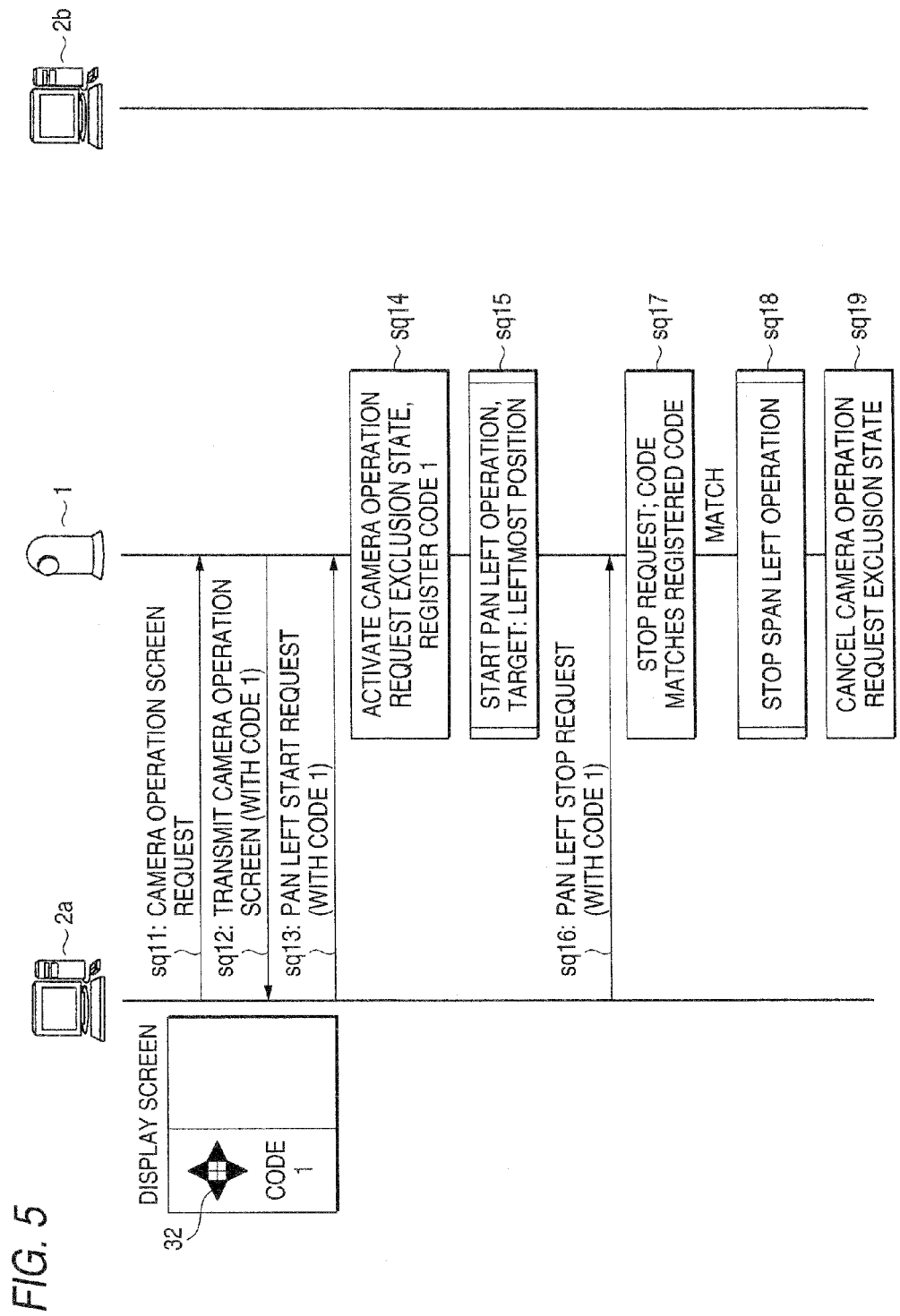
FIG. 5 is a sequence chart of operation of a camera unit by a client terminal according to Embodiment 1 of the invention while avoiding a conflict with anther terminal.

Next, the second case (2) in which "Pan Left" operation is made from the camera operation screen of the client terminal 2*a* and "Pan Left" operation is stopped will be described. FIG. 5 is a sequence chart of operation of a camera unit by a client terminal according to Embodiment 1 of the invention while avoiding a conflict with another terminal. When a camera operation screen request is issued by the client terminal 2*a* (sq 11), the code determination means 19*a* of the camera unit 1 determines "Code 1" by way of a system clock and creates camera operation screen information, then transmits the camera operation screen information to which "Code 1" is attached (sq 12). Then, "Pan Left" on the camera operation button 32 is selected on the camera operation screen of the client terminal 2*a*. A rotation start request to which "Code 1" of "Pan Left" is attached is transmitted by way of the start/stop button (including a case where the above camera operation button 32 is shared and a case where the camera operation button 32 is separately provided; ditto for the subsequent description) (sq 13).

The camera unit 1, receiving a rotation start request including "Code 1", sets the camera operation flag to the client terminal 2*a* to place it in the exclusive operation state and registers "Code 1" to the code storage means 15*c* (sq 14). The camera unit 1 starts "Pan Left" operation while targeting at the leftmost position (sq 15).

When the camera operation button 32 on the camera operation screen is operated or a separate start/stop button is pressed to transmit a "Pan Left" stop request including "Code 1" from the client terminal 2*a* (sq 16), the operation request determination means 14*a* of the camera unit 1 extracts the stop request "Code 1" and checks the code against "Code 1" registered to the code storage means 15*c* (sq 17) and, in case there is a match, stops "Pan Left" operation (sq 18). Next, the camera unit 1 cancels the exclusive operation state (sq 19) and returns to the standby state.

Figure 6:
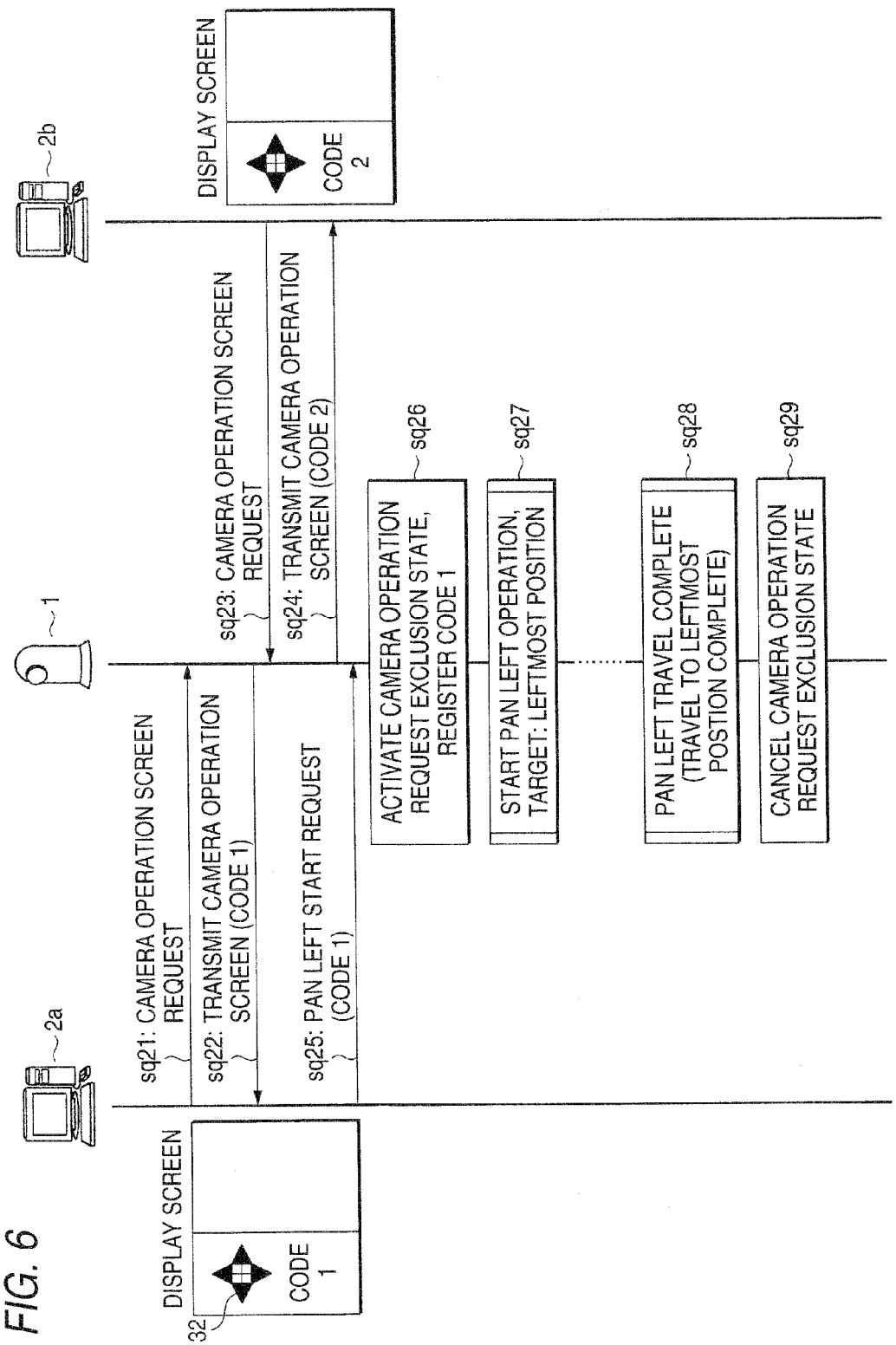
FIG. 6 is a sequence chart of operation of a camera unit by a client terminal according to Embodiment 1 of the invention while avoiding a conflict with another terminal.

The case where the camera unit 1 travels to the leftmost position without receiving a "Pan Left" stop request or an operation request from another terminal during "Pan Left" operation will be described. FIG. 6 is a sequence chart of operation of a camera unit by a client terminal according to Embodiment 1 of the invention while avoiding a conflict with another terminal. When a camera operation screen request is made by the client terminal 2*a* (sq 21), the code determination means 19*a* of the camera unit 1 determines "Code 1" by way of a system clock and creates camera operation screen information, then transmits the camera operation screen information to which "Code 1" is attached (sq 22).

In this state, when "Pan Left" is selected on the camera operation screen of the client terminal 2*c* and the start/stop button is used to issue a camera operation screen request from the client terminal 2*b* (sq 23), the camera unit 1 determines "Code 2" by way of a system clock and creates camera operation screen information, then transmits the camera operation screen information to which "Code 2" is attached (sq 24).

After that, "Pan Left" on the camera operation button 32 is selected on the camera operation screen of the client terminal 2*a*. The start/stop button is used to transmit a rotation start request to which "Code 1" of "Pan Left" is attached (sq 25).

The camera unit 1, receiving a rotation start request including "Code 1", sets the camera operation flag to the client terminal 2*a* to place it in the exclusive operation state and registers "Code 1" to the code storage means 15*c* (sq 26). The camera unit 1 starts "Pan Left" operation while targeting at the leftmost position (sq 27). A "Pan Left" stop request including "Code 1" is not transmitted from the client terminal 2*a*, the camera unit 1 executes "Pan Left" operation to the leftmost position and stops operation there (sq 28). The camera unit 1 then resets the camera operation flag to cancel the exclusive operation state (sq 29) and returns to the standby state.

Figure 7:
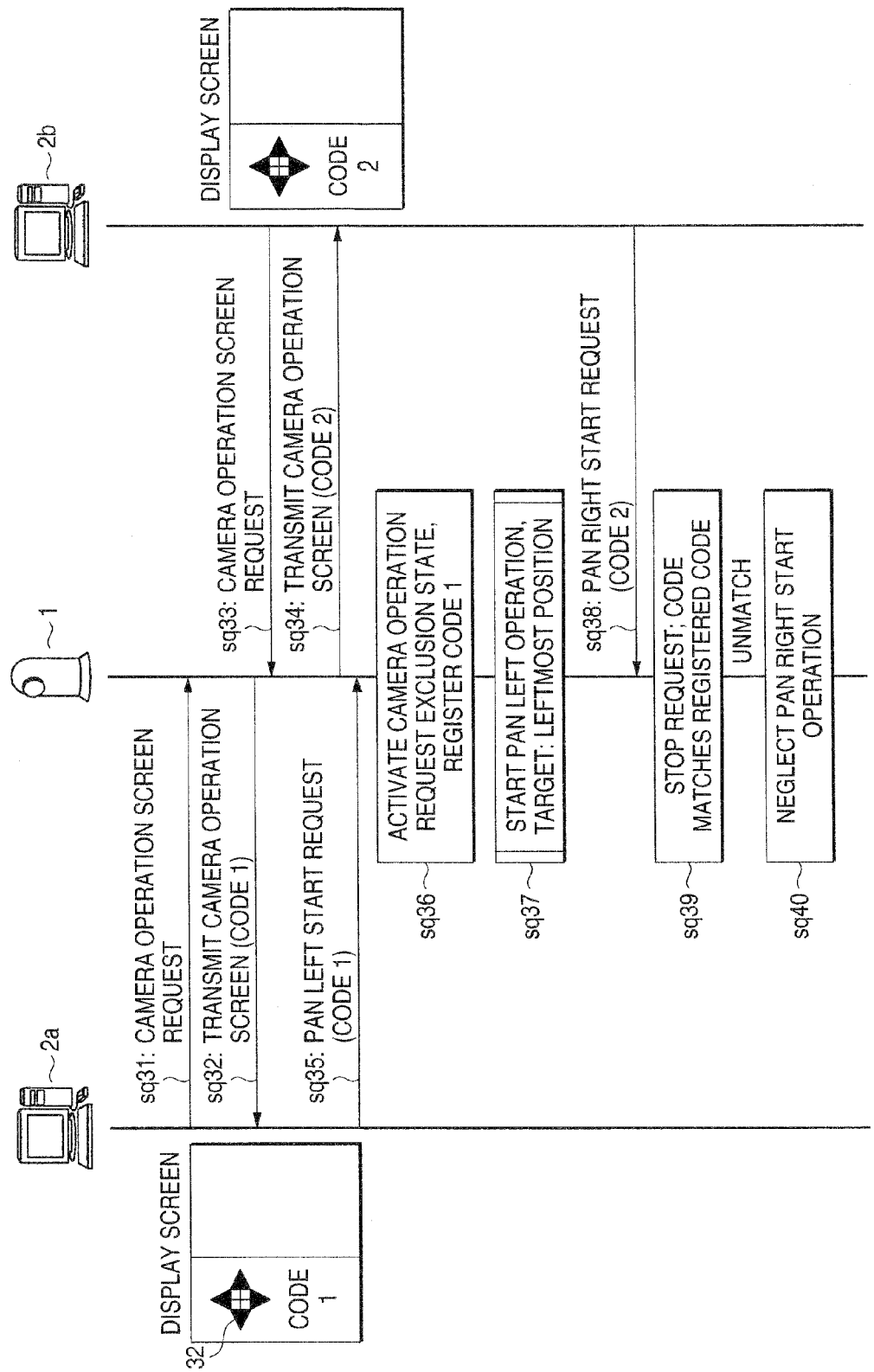
FIG. 7 is a sequence chart assumed when processing on a client terminal according to Embodiment 1 of the invention has run in conflict with processing on another terminal.

Finally, the case (4) where "Pan Left" operation is instructed from the camera operation screen of the client terminal 2*a* and another operation request is issued from another client terminal 2*b* during this operation will be described. FIG. 7 is a sequence chart assumed when processing on a client terminal according to Embodiment 1 of the invention has run in conflict with processing on another terminal.

In FIG. 7, when a camera operation screen request is issued from the client terminal 2a (sq 31), the code determination means 19a of the camera unit 1 determines "Code 1" by way of a system clock and creates camera operation screen information, then transmits the camera operation screen information to which "Code 1" is attached (sq 32).

In this state, when a camera operation screen request is issued from the client terminal 2b (sq 33), the camera unit 1 determines "Code 2" by way of a system clock and creates camera operation screen information, then transmits the camera operation screen information to which "Code 2" is attached (sq 34). After that, "Pan Left" on the camera operation button 32 is selected on the camera operation screen of the client terminal 2a. The start/stop button is used to transmit a rotation start request to which "Code 1" is attached (sq 35).

The camera unit 1, receiving a rotation start request including "Code 1", sets the camera operation flag to the client terminal 2a to place it in the exclusive operation state and registers "Code 1" to the code storage means 15c (sq 36). The camera unit 1 starts "Pan Left" operation while targeting at the leftmost position (sq 37).

In this state, "Pan Right" on the camera operation button 32 is selected on the camera operation screen of the client terminal 2b and the start/stop button is used to issue a rotation start request to which "Code 2" is attached (sq 38). The camera operation flag being set, the camera unit 1 checks whether the request transmitted is a stop request and whether the extracted "code 1" matches "Code 1" registered to the code storage means 15c (sq 39). The request transmitted in sq 38 is a rotation start request and the code is "Code 2" which is different from "Code 1" registered. Thus, the camera unit 1 neglects the "Pan Right" request received from the client terminal 2b (sq 40) and returns to the standby state.

In this way, the camera unit 1 according to Embodiment 1 can identify client terminals and discard an imaging section drive request from another client terminal while a client terminal is performing control. It is possible to control a camera unit from a general-purpose browser. While only a "Pan Left" start request for counterclockwise rotation is mentioned as an imaging section drive request in the foregoing description, a clockwise rotation request ("Pan Right" start request), a counterclockwise rotation request ("Pan Left" start request), a downward rotation request ("Tilt down" start request), an upward rotation request ("Tilt up" start request), a zoom-in request, a zoom-out request, a focus-near request, and a focus-far request can be controlled.

In the period in which the camera unit 1 has started operation and has reached the target position, or in the period in which the camera unit 1 has received a stop request and has stopped operation (the period until completion of the operation of the camera unit 1), requests do not conflict with each other between two client terminals despite a request from another client terminal. It is possible to cancel the exclusive operating state when it is determined that an imaging section drive request including a code is not received from a client terminal. It is sufficient to receive coded camera operation screen information and transmit a coded imaging section drive request. The process is transparent to the client terminal. Management of control right holding time is no longer unnecessary and operation is allowed in units of imaging section drive request destined to a camera unit. Control right can be transferred to another client terminal when the camera unit has halted and its purpose fulfilled. This provides a comfortable operating environment to the user.

INDUSTRIAL APPLICABILITY

A camera unit according to this invention is applicable to a case where a large number of users control a common camera unit from a general-purpose browser while avoiding a conflict of camera operation in units of an imaging section drive request.

The invention claimed is:

1. A camera unit which takes a picture of a subject and transfers a image data to a client terminal, wherein:
   the camera unit, when a first signal is received from the client terminal, transmits an identification-information to the client terminal; and
   the camera unit, when a second signal including the identification information is received from the client terminal, works in accordance with the second signal on a priority basis for a predetermined period after receiving the second signal.

2. The camera unit according to claim 1, wherein:
   the first signal is an access signal transmitted from the client terminal to the camera unit; and
   the second signal is a camera operation signal transmitted from the client terminal to the camera unit.

3. The camera unit according to claim 2, wherein:
   the camera operation signal includes a signal for rotating an imaging section.

4. The camera unit according to claim 2, wherein:
   the camera unit, when an access signal is transmitted from the client terminal, provides a link to the URL of an image in order to display the camera-shot image in the screen format, displays a camera operation button on the screen of a destination client terminal, generates camera operation screen information describing that an imaging section drive request signal including identification information is transmitted to the camera unit by the operation of the camera operation button; and
   transmits the camera operation screen information to the client terminal.

5. The camera unit according to claim 1, wherein:
   the identification information is a system-clock obtained by counting clock signals of the camera unit.

6. The camera unit according to claim 1, wherein:
   the camera unit, when the second signal is received from the client terminal, registers identification information attached to the second signal to a memory as well as controls the imaging section in accordance with the second signal in case such that the camera unit is not operating; and
   the camera unit does not work in accordance with the second signal in case such that the identification information registered to the memory does not match the identification information attached to the second signal received from the client terminal for a predetermined period afterwards.

7. The camera unit according to claim 1, wherein:
   the predetermined period is a period from when the camera unit starts operation in accordance with the second signal to when the operation is complete.

8. The camera unit according to claim 1, wherein:
   the predetermined period is a period from receiving the second signal to which identification information is attached to when a signal including the identification information is not received for a predetermined time.

9. A camera unit which takes picture of a subject and transfers the image data, the camera unit comprising:

an imaging section;

an image generator, converting an image shot with the imaging section to an image data;

an identification information determiner that determines identification information in response to an access signal from a client terminal via a network;

a camera operation screen generator that generates camera operation screen information including the identification information for operation on the client terminal;

an imaging section controller that controls the shooting direction of the imaging section;

a network server that receives the access signal via the network, and transmits the image data generated by the image generator and the camera operation screen information to the client terminal via the network;

a registered that registers to a memory the identification information attached to a first camera operation signal transmitted from the client terminal; and a determiner which, when a second camera operation signal is received, determines whether the identification information registered in the memory is included in the second camera operation signal, and instructs the imaging controller to start operation in accordance with the second camera operation signal in case the identification information registered in the memory is included in the second camera operation signal, and rejects the second camera operation signal in case the identification information registered in the memory is not included in the second camera operation signal.

10. The camera unit according to claim 9, wherein the identification information is a system clock obtained by counting clock signals of the camera unit.

11. A camera unit control method, the method capable of driving an imaging section by way of a signal from a client terminal, the method comprising:

when a first signal is received from the client terminal, determining identification information to be transmitted to the client terminal and transmitting the identification information to the client terminal together with camera operation screen information; and when a second signal to which the identification information is attached is received from the client terminal, the camera unit control method operates exclusively in accordance with the second signal on a priority basis for a predetermined period after receipt of the second signal.

12. The camera unit control method according to claim 11, wherein:

an exclusive operation state exists while the camera unit control method is operating in accordance with the second signal from the client terminal; and the camera unit control method further comprises registering to a memory the identification information attached to the second signal received from the client terminal in the exclusive operation state.

13. The camera unit control method according to claim 11, wherein:

in response to an operation stop request signal to which identification information is attached from the client terminal in the exclusive operation state, the camera unit control method further comprises checking whether the identification information attached to the operation stop request signal is registered to the memory, and stopping operation in accordance with the operation stop request signal only in case there is a match.

14. A camera unit control method, the method capable of driving an imaging section, the method comprising:

when a camera operation screen request signal is received from the client terminal, determining an identification information to be transmitted to the client terminal and transmitting the identification information to the client terminal together with camera operation screen information, when a first camera operation signal to which identification information is attached is received from the client terminal, registers the identification information to a memory and starts operation in accordance with the first camera operation signal, and when a second camera operation signal to which identification information is attached is received from the client terminal, the camera unit control method operates in accordance with the second camera operation signal in case the identification information attached to the second camera operation signal is registered to the memory and rejects the second camera operation signal in case the identification information attached to the second camera operation signal is not registered to the memory.

15. The camera unit control method according to claim 14, wherein:

an exclusive operation state exists while the camera unit control method is operating in accordance with an operation start request signal received from a client terminal, the camera unit control method further comprises checking whether a code extracted from an operation stop request signal matches a code registered to the memory and stopping operation in accordance with the operation stop request signal in case there is a match, and on completion of the exclusive operation state, registering to the memory code information extracted from a second operation start request signal from a client terminal, and the camera unit control method operating in accordance with the second operation start request signal.

16. The camera unit control method according to claim 14, wherein:

the first camera operation signal and the second camera operation signal include a clockwise rotation request, a counterclockwise rotation request, a downward rotation request, an upward rotation request, a zoom-in request, a zoom-out request, a focus-near request, and a focus-far request.

17. A control method for a camera unit, the camera unit comprising a drive section for operating an imaging section and the shooting direction of the imaging section, the camera unit capable of driving the imaging section, wherein a code determiner, in response to a camera operation screen request issued by a first client terminal, determines "Code 1" and transmits, to the first client terminal, camera operation screen information to which the "Code 1", is attached, and the code determiner, in response to a camera operation screen request issued by a second client terminal, determines "Code 2" and transmits, to the second client terminal, camera operation screen information to which the "Code 2" is attached, the method comprising:

in response to a first camera operation signal to which "Code 1" is attached transmitted from the first client terminal, setting the first client terminal to the exclusive operation state and registering the "Code 1" to a memory and starting operation in accordance with the first camera operation signal, and in response to a camera operation signal to which code information is attached from a client terminal which is placed in the exclusive operation state, checking whether the code information attached to the second camera operation signal matches the "Code 1" registered to the memory and the control method for a camera unit operating in accordance with the second camera operation signal only in case there is a match.

18. The camera unit according to claim 17, wherein the code is time information.

19. A camera unit which receives a camera operation screen request signal from a client terminal, and determines a code to be transmitted to the client terminal and transmits the code to the client terminal together with camera operation screen information, which, when a first camera operation signal to which the code is attached is received from the client terminal, operates in accordance with the first camera operation signal as well as registers to a memory the code transmitted together with the first camera operation signal, and which, when a second camera operation signal is received within a predetermined period, determines whether a code attached to the second camera operation screen signal matches the code registered to the memory and rejects the second camera operation signal when the code attached to the second camera operation signal does not match the code registered to the memory.

20. The camera unit according to claim 19, wherein the predetermined period is a period to completion of driving an imaging section in accordance with the first camera operation signal.

21. The camera unit according to claim 19, wherein the predetermined period is a period until when it is determined that a signal including the code is not received for a predetermined time.

22. The camera unit according to claim 19, wherein the camera unit transmits to the client terminal a request format including the code and used to signal from the client terminal.

23. The camera unit according to claim 22, wherein the request format is the cgi format.

24. A camera unit which shoots a subject and transfers the image data, the camera unit comprising:

an imaging section;
a driver that drives the imaging section;
an image section controller that is operable to drive the drive section in accordance with a signal from a client terminal;
an image generator that converts an image shot with the imaging section to image data;
a code determiner that determines a code in response to an access signal from the client terminal via a network;
a camera operation screen generator that generates camera operation screen information for operation on a client;
a network server, that receives the access signal via the network, and transmits the image data generated by the image generator and the camera operation screen information to the client terminal via the network;
a code registered that registers to a memory a code attached to a first camera operation signal received from the client terminal;
an operation request determiner which, when a second camera operation signal is received while the imaging section controller is operating in accordance with the first camera operation signal from the client terminal, determines whether the code registered to the memory is included in the second camera operation signal; and
a controller that, when the operation request determiner determines that the same code registered to the memory is included in the second camera operation signal, operates in accordance with the signal and rejects the second camera operation signal in case the operation request determiner determines that the code registered to the memory is included in the second camera operation signal.

25. The camera unit according to claim 24, wherein:
the camera operation screen generator generates a request format including the code determined by the code determiner, the request format activating the operation request determiner, and wherein the network server transmits the request format to the client terminal.

* * * * *